(12) United States Patent
Zhang et al.

(10) Patent No.: US 12,007,401 B2
(45) Date of Patent: Jun. 11, 2024

(54) SAMPLE ANALYSIS SYSTEM AND CONTROL METHOD FOR THE SAME AND SAMPLE ANALYSIS METHOD

(71) Applicant: SHENZHEN THISTORY BIO-MEDICAL CO., LTD, Guangdong (CN)

(72) Inventors: Huali Zhang, Guangdong (CN); Shaoyong Wu, Guangdong (CN); Peng Xue, Guangdong (CN); Huawei Zhang, Guangdong (CN); Qiaobo Yin, Guangdong (CN)

(73) Assignee: SHENZHEN THISTORY BIO-MEDICAL CO., LTD, Shenzhen (CN)

( * ) Notice: Subject to any disclaimer, the term of this patent is extended or adjusted under 35 U.S.C. 154(b) by 534 days.

(21) Appl. No.: 17/241,034

(22) Filed: Apr. 26, 2021

(65) Prior Publication Data

US 2021/0247410 A1   Aug. 12, 2021

Related U.S. Application Data

(63) Continuation of application No. PCT/CN2019/091379, filed on Jun. 14, 2019.

(30) Foreign Application Priority Data

Jun. 6, 2019   (CN) .......................... 201910490798.5

(51) Int. Cl.
*G01N 35/00*   (2006.01)
*G01N 35/04*   (2006.01)

(52) U.S. Cl.
CPC ....... *G01N 35/00584* (2013.01); *G01N 35/04* (2013.01); *G01N 2035/0465* (2013.01); *G01N 2035/0484* (2013.01)

(58) Field of Classification Search
CPC ............ G01N 35/00584; G01N 35/04; G01N 2035/0465; G01N 2035/0484;
(Continued)

(56) References Cited

U.S. PATENT DOCUMENTS

| 2004/0042339 A1 | 3/2004 | Gebrian et al. |
| 2006/0083660 A1 | 4/2006 | Schorno et al. |

(Continued)

FOREIGN PATENT DOCUMENTS

| CN | 101065670 A | 10/2007 |
| CN | 105974894 A | 9/2016 |

(Continued)

OTHER PUBLICATIONS

International Search Report of PCT Patent Application No. PCT/CN2019/091379 dated Mar. 12, 2020.

(Continued)

*Primary Examiner* — Tarun Sinha

(57) ABSTRACT

The present disclosure relates to the technical field of automated analysis, and provides a sample analysis system and a control method for the same and a sample analysis method. The sample analysis system includes: a control device; a rail device for carrying cuvettes under control of the control device; at least one independent sample distribution node arranged on the rail device for distributing samples to the cuvettes, the independent sample distribution node being used for sample aspiration, transfer, and discharge; and at least two independent reagent distribution and measurement nodes arranged on the rail device for distributing test reagents to the cuvettes and measuring the mixture liquid in the cuvettes, the independent reagent distribution and measurement nodes being used for reagent aspiration, transfer, and discharge and reagent-sample mixture liquid measurement.

14 Claims, 13 Drawing Sheets

(58) Field of Classification Search
CPC ..... G01N 35/1083; G01N 2035/00326; G01N 35/1002; G01N 35/0092
See application file for complete search history.

(56) References Cited

U.S. PATENT DOCUMENTS

| | | |
|---|---|---|
| 2011/0123397 A1 | 5/2011 | Yamato et al. |
| 2011/0262303 A1* | 10/2011 | Burkhardt .............. G01N 35/00 422/65 |
| 2012/0308435 A1 | 12/2012 | Fritchie |
| 2013/0317773 A1 | 11/2013 | Oda et al. |
| 2014/0170023 A1 | 6/2014 | Saito et al. |
| 2015/0298321 A1* | 10/2015 | Gross ................... B65G 11/023 422/67 |
| 2015/0338427 A1 | 11/2015 | Pollack et al. |
| 2017/0045545 A1 | 2/2017 | Pollack et al. |
| 2018/0156831 A1 | 6/2018 | Raicu et al. |
| 2018/0313861 A1 | 11/2018 | Takai et al. |
| 2019/0162742 A1 | 5/2019 | Grohbuhl |

FOREIGN PATENT DOCUMENTS

| | | |
|---|---|---|
| CN | 107271709 A | 10/2017 |
| EP | 3492923 A2 | 6/2019 |
| JP | H11316238 A | 11/1999 |
| WO | 2016205986 A1 | 12/2016 |
| WO | 2017177466 A1 | 10/2017 |

OTHER PUBLICATIONS

Search report of counterpart European Patent Application No. 19931868.4 dated Sep. 23, 2022.

* cited by examiner

SAMPLE ANALYSIS SYSTEM AND CONTROL METHOD FOR THE SAME AND SAMPLE ANALYSIS METHOD

CROSS REFERENCE TO RELATED APPLICATIONS

The present application is a Continuation Application of PCT Application No. PCT/CN2019/091379 filed on Jun. 14, 2019, which claims the benefit of Chinese Patent Application No. 201910490798.5 filed on Jun. 6, 2019. All the above are hereby incorporated by reference in their entirety.

TECHNICAL FIELD

The present disclosure relates to the technical field of automated analysis, and more particularly to a sample analysis system and a control method for the same and a sample analysis method.

BACKGROUND

Nowadays, automation of sample analysis has become a major trend in the development of scientific analysis and in vitro diagnostic industry. Many enterprises in this industry have launched various models of automated sample analysis system and automated pipeline analysis system.

Existing automated analysis systems generally include various components related to sample distribution such as sample aspiration, transfer, and discharge, and various components related to sample analysis such as reagent aspiration, transfer, discharge, incubation, and measurement. These components work in coordination with a mutually restrictive structure and a spatial cooperation relationship, so that a set of complete sample distribution, reagent distribution, transfer, and measurement related modules and components together constitute an independent analysis system.

The components of this system are designed by a complete set of solutions.

Disassembly of components or modules makes the system incapable of normal operation, so the system is indivisible and non-expandable. In such a system, certain component resources will be wasted, and the system cannot perform to its maximum efficiency and is incapable of free combination and efficient expansion.

International Patent WO 2016205986A1 discloses a sample analysis device, which includes an independent analyzer with integrated sample distribution, transfer, and analysis modules. Multiple cuvette buffering devices are used to provide cuvettes without interruption, avoiding frequent manual operation and time consumption. However, in the process of actual application, different samples can only be analyzed separately in order, resulting in a low analysis speed. At the same time, relatively independent and complete analysis system have a too large size for subsequent expansion and maintenance of the analysis system.

In order to obtain a higher analysis speed, in a commercial automated analysis system, multiple relatively independent and complete analysis systems are connected to each other via rails in a pipeline manner. U.S. patent US2013317773A1 and International Patent WO2017/177466A1 disclose two types of conveying devices, both of which provide samples to an independent analyzer with complete functions, but do not change the structural restrictive relationship between internal modules of the analyzer and its efficiency.

U.S. Patent US20180313861A1 discloses a sample analysis system, and its conveying device includes: a robotic arm that conveys a container or a container rack between two sample analysis devices, and a base supporting the robotic arm. With use of this conveying device, it is still essentially a sample conveying solution and does not improve the efficiency of the analyzer system at the analyzer level.

The above-mentioned patent implements a commercial automated analysis system pipeline, which is formed by connection of independent analysis systems with multiple complete functions. It is bulky, and sample distribution related aspiration, discharge, quantification, and other functional modules, and reagent distribution, incubation, measurement, blending and other related modules are bound in the analysis system and structurally interdependent, and are arranged as a combined instrument unit. In the process of actual application, the relevant modules of the incubation and measurement functions often include speed-limiting steps. For example, in the process of most immune reactions, the testing time for a single reaction reaches a time length of several minutes to tens of minutes, and sample distribution, including aspiration, transfer, and discharge, seldom requires uncertain reaction time limits. In this case, the pipeline analysis system solution of conventional complete analysis system combination will make a large number of sample related component resources fail to perform to their maximum efficiency, resulting in cost, efficiency, and volume wastes, thereby making it impossible to expand efficiently.

SUMMARY

An embodiment of the present disclosure provides a sample analysis system intended to solve the problems of bulk and incapability of free combination, high efficiency, and expansion of existing sample analysis systems.

An embodiment of the present disclosure provides a sample analysis system including: a control device; a rail device for carrying cuvettes under control of the control device; at least one independent sample distribution node arranged on the rail device for distributing samples to the cuvettes, the independent sample distribution node being used for sample aspiration, transfer, and discharge; and at least two independent reagent distribution and measurement nodes arranged on the rail device for distributing test reagents to the cuvettes and measuring the mixture liquid in the cuvettes, the independent reagent distribution and measurement nodes being used for reagent aspiration, transfer, and discharge and reagent-sample mixture liquid measurement; the cuvettes being used for containing the sample and reagent and signal measurement.

An embodiment of the present disclosure further provides that the rail device includes multiple node rails corresponding to the sample distribution node and the reagent distribution and measurement nodes for communication between individual nodes. The multiple node rails constitute an integrated synchronized motion structure or a dividable structure consisting of free assembly and combination.

An embodiment of the present disclosure further provides that the sample distribution node includes:
 a sample distribution control device;
 a sample distribution device for aspiration, transfer, and discharge of the sample to the cuvette in the current node under control of the sample distribution control device; and
 a sample distribution node fixing frame for fixing various portions of the sample distribution node to an independent structure.

An embodiment of the present disclosure further provides that the reagent distribution and measurement node includes:
- a reagent distribution and measurement control device;
- a reagent distribution and measurement device for aspiration, transfer, and discharge of the reagent to the cuvette in the current node for measurement under control of the reagent distribution and measurement control device; and
- a reagent distribution and measurement node fixing frame for fixing various portions of the reagent distribution and measurement node to an independent structure.

An embodiment of the present disclosure further provides that the analysis system has concurrency.

Combination of a sample distribution node with a reagent distribution and measurement node provides a basic measurement function of the analysis system. The reagent distribution and measurement node and sample distribution node beyond the basic measurement function combination constitute concurrent operation nodes.

Under coordination by the control system, in the case that the reagent distribution and measurement node and sample distribution node beyond the basic measurement function combination are in the failure mode or the halt mode, said basic measurement function can still realize the sample analysis process.

An embodiment of the present disclosure further provides that the analysis system is characterized in that:

The sample distribution node and reagent distribution and measurement nodes are combined according to different combination rules and arranged on the rail device to constitute different sample analysis systems. These sample analysis systems can be expanded by adding sample distribution and reagent distribution and measurement nodes and configuring the rail device.

An embodiment of the present disclosure further provides that the sample analysis system further includes:
- a cuvette distribution node for providing cuvettes to other nodes in the sample analysis system.

An embodiment of the present disclosure further provides that the cuvette distribution node further includes:
- a cuvette distribution control device;
- a cuvette distribution device for loading the cuvettes onto the rail device in order under control of the cuvette distribution control device; and
- a cuvette distribution node fixing frame for fixing various portions of the cuvette distribution node to an independent structure.

An embodiment of the present disclosure further provides that the reagent distribution and measurement node further includes a blending mechanism for blending the sample, the reagent, and the reagent-sample mixture liquid evenly.

An embodiment of the present disclosure further provides that the reagent distribution and measurement node further includes a gripper mechanism and a motion mechanism. The gripper mechanism is used for gripping the cuvette on the rail or in a vehicle. The motion mechanism is used for bringing and transferring the cuvette gripped by the gripper mechanism to the measurement location at the reagent distribution and measurement node.

An embodiment of the present disclosure further provides that the reagent distribution and measurement node further includes a reagent storage module for storing the analysis reagent.

An embodiment of the present disclosure further provides that the cuvette is a container made of a solid material to serve as a carrier for sample and reagent distribution, transfer, and measurement.

An embodiment of the present disclosure provides a control method for a sample analysis system for controlling the sample analysis system, including the steps of:
- acquiring a task type and the status of the nodes;
- determining a combination rule for the nodes based on the task type and the status of the nodes; and
- performing sample analysis based on the combination rule.

An embodiment of the present disclosure further provides that the step of performing sample analysis based on the combination rule includes:
- planning a testing path including selection and combination of the nodes and rails based on the combination rule; and
- performing sample analysis based on the testing path.

An embodiment of the present disclosure provides a sample analysis method for the sample analysis system, including the steps of:
- distributing, by the cuvette distribution node, cuvettes onto the rail device and conveying the cuvettes to the sample distribution node by way of the rail device communicating the multiple nodes;
- distributing, by the sample distribution node, the samples to the cuvettes;
- conveying the cuvettes to the reagent distribution and measurement nodes through movement of the rail device;
- distributing, by the reagent distribution and measurement nodes, the analysis reagent to the cuvettes, and performing measurement and analysis on the sample-reagent mixture liquid in the cuvettes; and
- finishing analysis or repeating the steps described above.

The sample analysis system uses cuvettes as the medium and employs multiple relatively independent sample distribution nodes and multiple relatively independent reagent distribution and measurement nodes that are freely combined and connected via rails, so that the restriction of physical cooperation relationship between sample distribution components and sample analysis components in conventional instruments are eliminated, thereby providing a fully automated analysis system with small size, high efficiency, high freedom, and high expandability. Besides, the nodes can be freely added and freely combined and connected to form analysis systems with different speeds and analysis functions, thereby significantly improving the utilization of the structural components in the instrument and enabling easy installation and maintenance.

DESCRIPTION OF THE EMBODIMENTS

In order to make the objectives, technical solutions and advantages of the present disclosure more apparent, the present disclosure will be further described in detail below with reference to the accompanying drawings and embodiments. It should be understood that the specific embodiments described herein are only intended to explain the present disclosure, and not to limit the present disclosure.

In the present disclosure, different distributed sample analysis systems can be assembled from multiple expandable independent sample distribution nodes and reagent distribution and measurement nodes that are freely combined via a rail device under control of a control device.

In order to explain the technical solutions of the present disclosure, description will be made below with specific embodiments.

First Embodiment

Figure 1A:
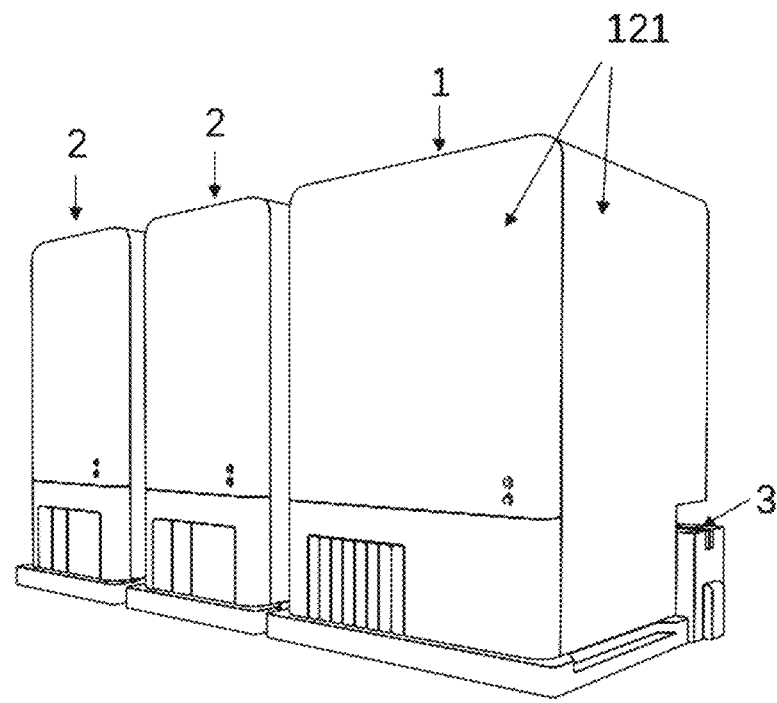
FIG. 1A is a side structural view of a sample analysis system according to the present disclosure.
Figure 1B:
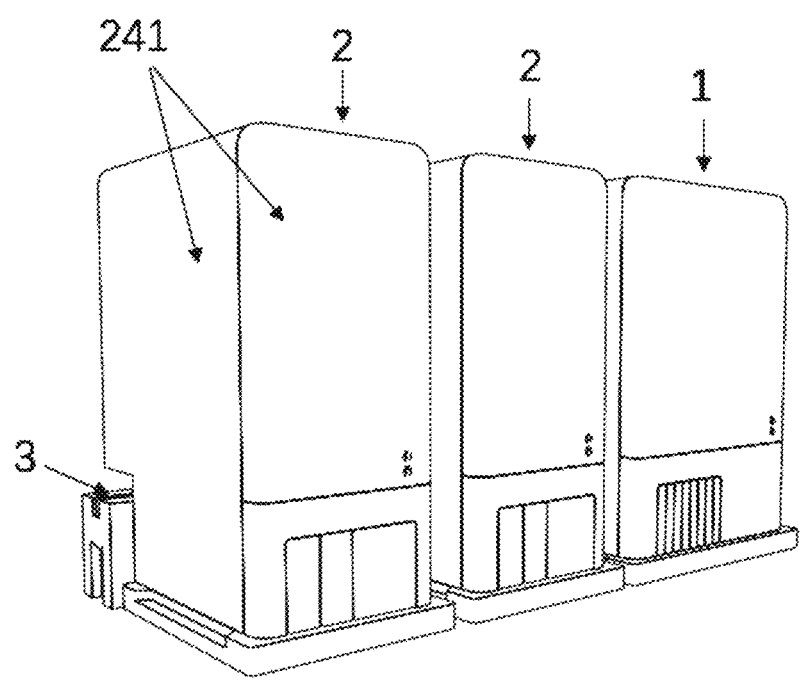
FIG. 1B is another side structural view of a sample analysis system according to the present disclosure.
Figure 1C:
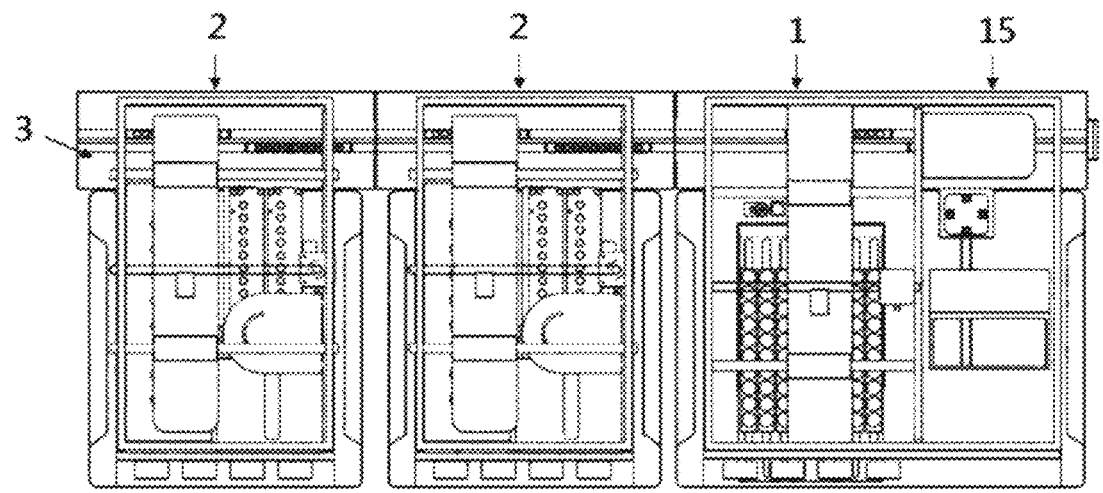
FIG. 1C is a top structural view of a sample analysis system according to the present disclosure.
Figure 2A:
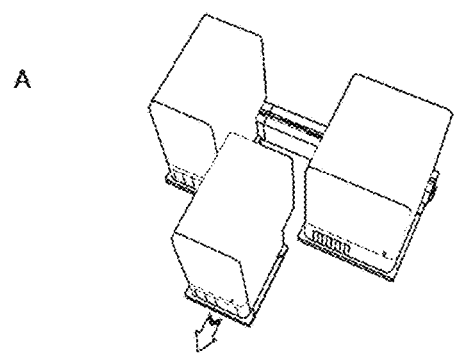
FIG. 2A is a structural view showing assembly and disassembly of a sample analysis system according to the present disclosure.
Figure 2B:
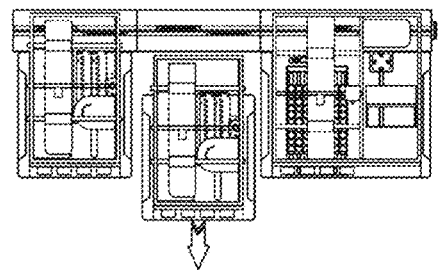
FIG. 2B is a top structural view showing assembly and disassembly of a sample analysis system according to the present disclosure.
Figure 2C:
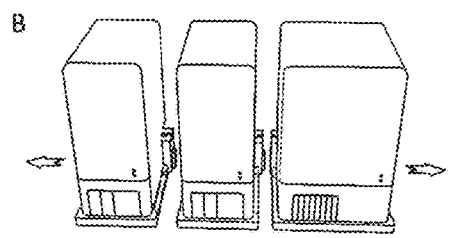
FIG. 2C is another structural view showing assembly and disassembly of a sample analysis system according to the present disclosure.
Figure 2D:
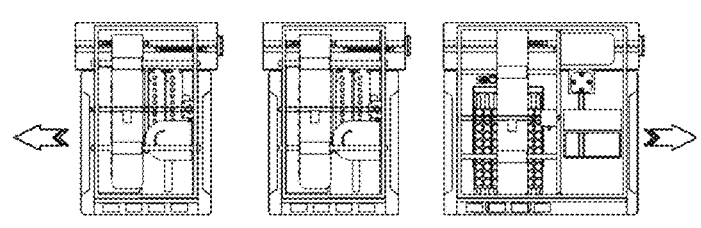
FIG. 2D is another top structural view showing assembly and disassembly of a sample analysis system according to the present disclosure.

As show in FIGS. 1A, 1B, and 1C, which are side and top structural views of a distributed sample analysis device mentioned above, a distributed sample analysis system according to the present disclosure includes:

a control device;

a rail device 3 for carrying cuvettes under control of the control device;

at least one independent sample distribution node 1 arranged on the rail device 3 for distributing samples to the cuvettes, the independent sample distribution node 1 being used for sample aspiration, transfer, and discharge; and at least two independent reagent distribution and measurement nodes 2 arranged on the rail device 3 for distributing test reagents to the cuvettes and measuring the mixture liquid in the cuvettes, the independent reagent distribution and measurement nodes 2 being used for reagent aspiration, transfer, and discharge and reagent-sample mixture liquid measurement; the cuvettes being used for containing the sample and the reagent and signal measurement.

Figure 3A:
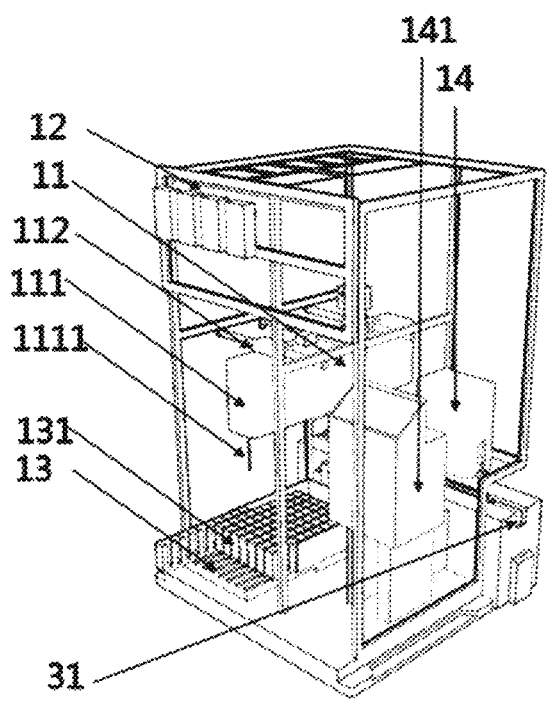
FIG. 3A is a side structural view of a sample distribution node 1 in a sample analysis system according to the present disclosure.
Figure 3B:
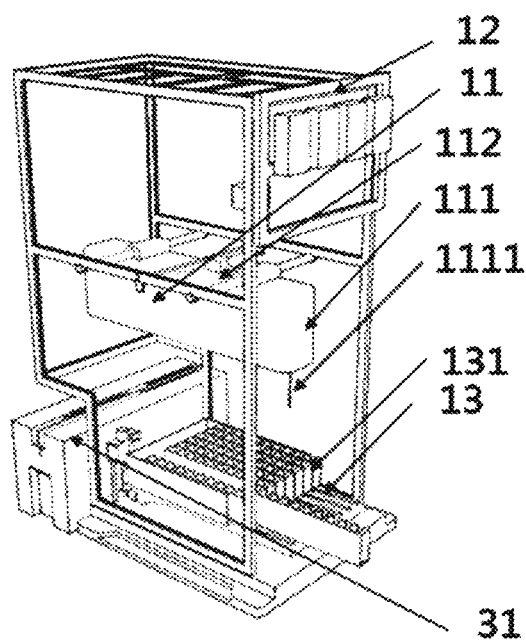
FIG. 3B is another side structural view of a sample distribution node 1 in a sample analysis system according to the present disclosure.
Figure 3C:
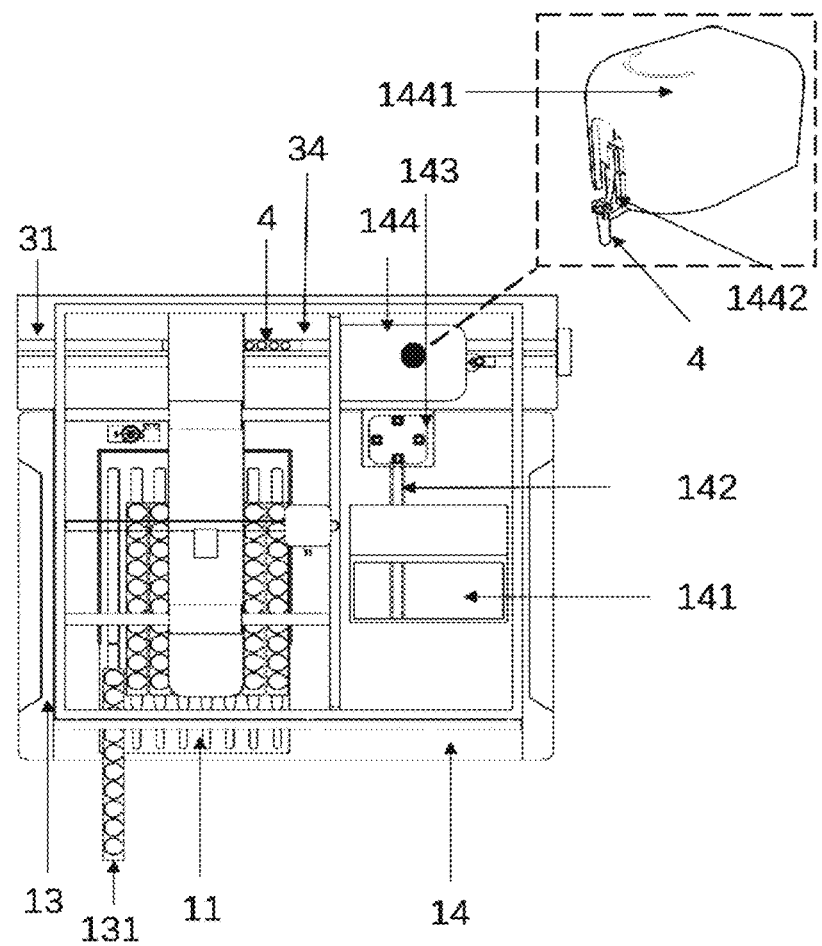
FIG. 3C is a top structural view of a sample distribution node 1 in a sample analysis system according to the present disclosure.

Referring to FIGS. 2A, 2B, 2C, 2D, 3A, 3B, and 3C, in which FIG. 2A to FIG. 2D are views showing assembly and disassembly of said sample analysis system according to the present disclosure and FIGS. 3A, 3B, and 3C are side and top views showing the implementation of said sample distribution node 1 including a cuvette distribution module, said distributed sample analysis system can be specifically formed by one sample distribution node 1 including a cuvette distribution module 14 and two reagent distribution and measurement nodes 2 that are detachably assembled and combined via rails 3. The manner of assembly and disassembly is shown at A in FIG. 2A or B in FIG. 2C. The cuvette distribution module 14 of the sample distribution node 1 delivers a batch of cuvettes 4 to the node rail 31 of the rail device 3. The samples are transferred into the cuvettes 4 by a sample transfer module of the sample distribution node, then transported to the location of the reagent distribution and measurement nodes 2 by the rail device 3, and measured and analyzed in the reagent distribution and measurement nodes 2 thereafter.

The nodes described above are independent functional units under control of said control device. For example, when one reagent distribution and measurement node 2 needs to be removed, the part of the node rail 32 can be reserved, without influencing the normal use of the sample analysis system, thereby facilitating maintenance. Alternatively, the node rail 32 and the reagent distribution and measurement node 2 can be detached and removed together, and the remaining nodes can be stilled assembled and used.

Also, new nodes can be added. In this way, free combination and efficient expansion of said sample analysis system is achieved.

Second Embodiment

In said sample analysis system, multiple sample distribution nodes 1 and reagent distribution and measurement nodes 2 can be selected according to a combination rule. Said control device controls the node rail corresponding to these selected nodes to have the nodes assembled onto the rail device 3 so as to communicate the individual nodes, or controls a certain node to be detached and removed from the rail device 3. The rail device 3 includes multiple node rails that may constitute an integrated synchronized motion structure or a dividable structure consisting of free assembly and combination. According to different combination rules, the sample distribution nodes 1 and reagent distribution and measurement nodes 2 can be added and arranged onto the rail device 3 for expansion, so as to obtain different sample analysis systems. The combination rules include speed priority principle, sample priority principle, resource priority principle, or the like.

Further, said sample analysis system has concurrency. That is, combination of a sample distribution node 1 with a reagent distribution and measurement node 2 provides a basic measurement function of the analysis system. The reagent distribution and measurement node and sample distribution node beyond the basic measurement function combination constitute concurrent operation nodes. Under coordination by the control system, in the case that the reagent distribution and measurement node 2 and sample distribution node 1 beyond the basic measurement function combination are in the failure mode or the halt mode, said basic measurement function can still realize the sample analysis process. For example, in a sample analysis system with a basic measurement function consisting of one sample distribution node 1 combined with one reagent distribution and measurement node 2, if the sample distribution node 1 has a fast sample distribution speed, then the number of the reagent distribution and measurement nodes 2 can be increased as appropriate (e.g., to two) and these nodes perform measurement concurrently under control of the control system. That is, samples can be distributed to the reagent distribution and measurement nodes 2 successively for concurrent testing, thereby improving the testing efficiency. If one of the reagent distribution and measurement nodes 2 fails or halts, then the remaining nodes can continue to operate and realize the corresponding analysis. The concurrency of the sample analysis system may not influence the normal operation of the overall system, thereby facilitating maintenance and repairs.

As shown in FIGS. 3A, 3B, and 3C, said sample distribution node 1 includes: a sample distribution control device; a sample distribution device connected to the sample distribution control device for aspiration, transfer, and discharge of the sample to the cuvette in the current node under control of the sample distribution control device; and a sample distribution node fixing frame 12 for fixing various portions of the sample distribution node to an independent structure.

Said sample distribution device further includes a node rail 31, a first cuvette distribution module 14, a sample transfer module 11, and a sample loading region 13.

An aspiration and discharge component 111 on the sample transfer module 11 aspirates a sample from a sample tube on the sample rack 131 in the sample loading region 13. Then through cooperation of the rail 112 and the sample transfer module 11, the aspiration and discharge component 111 is moved to the location of the cuvette 4 on the node rail 31, and the sample liquid is discharged to the cuvette 4.

In this embodiment, said aspiration and discharge component 111 includes, without limitation, a quantitative liquid aspiration and discharge component driven by pneumatic, electric, or hydraulic actuation. The structure of the sample aspiration component 1111 may be a tubular structure like a sample probe, a sample tube, or the like capable of quick sample aspiration.

The node rail 31 is used for transportation of the cuvettes 4. The cuvettes 4 may be placed directly on the rail and transported by the rail through mechanical driving such as fixation fitting, friction fitting, convex-concave structure fitting, or the like. In the case that the cuvettes 4 are placed directly on the rail, the cuvettes are preferably in the form of a cuvette row. Said rail has a mechanical design including, without limitation, a belt, a gear, a screw, or the like, for transmission movement. In some further possible embodiments, the cuvettes 4 may alternatively be placed on the node rail 31 by loading the cuvettes 4 onto the vehicle 34 arranged on the node rail 31. The vehicle 34 has a solid structure that can receive the cuvette 4.

The sample distribution node fixing frame 12 is used for fixing various modules and components integrated in the sample distribution node 1. The overall sample distribution node 1 has an independent panel 121 fixed thereto (refer to FIG. 1A) to form a relatively independent functional structure and facilitate combination with other nodes.

The sample loading region 13 serves as an input region for samples to facilitate transportation of samples to other nodes via the node rail 31. The samples are directly placed manually in the sample loading region 13, or fed into the sample loading region 13 via an automated motion mechanism (a mechanism other than the rail). Said samples may be distributed to a container directly from a blood collecting tube, manually, or in an automated manner in advance.

The first cuvette distribution module 14 is used for delivering cuvettes 4 quickly. Numerous cuvettes 4 are stored in a cuvette feeding mechanism 141, then the cuvettes 4 are loaded out of order into a slideway 142, and thereafter the cuvettes 4 arrive at a cuvette tray mechanism 143 under gravity. Thereafter, a gripper mechanism 144 grips and loads empty cuvettes 4 onto the node rail 31. In this way, the cuvettes 4 can be output in batch and in order, thereby improving the efficiency of cuvette delivery.

In this embodiment, the gripper mechanism 144 drives a gripper structure 1442 in movement through a driving component 1441 into an opened or closed status, so as to mate with the cuvettes 4, thereby improving the gripping efficiency.

Figure 4A:
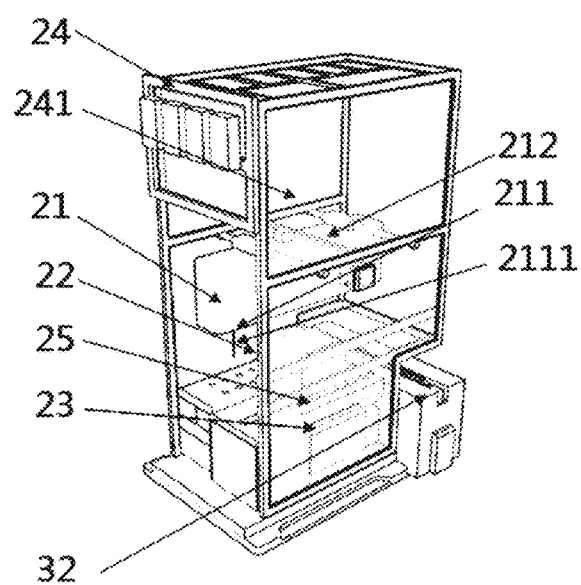
FIG. 4A is a side structural view of a reagent distribution and measurement node 2 in a sample analysis system according to the present disclosure.
Figure 4B:
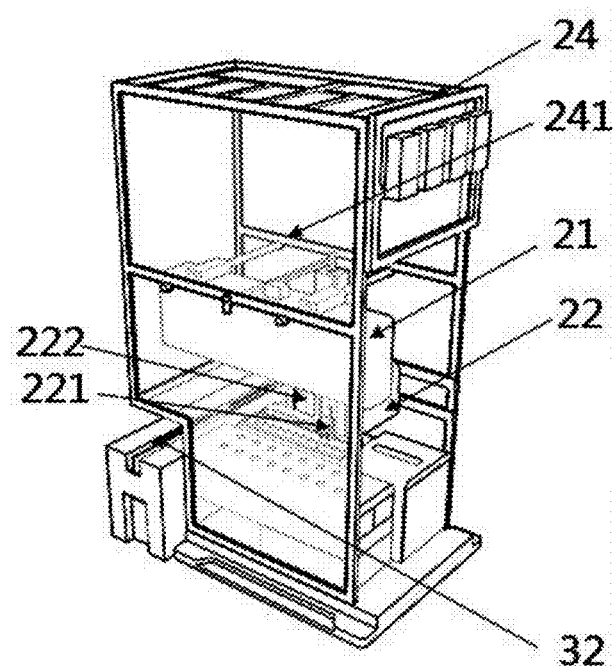
FIG. 4B is another side structural view of a reagent distribution and measurement node 2 in a sample analysis system according to the present disclosure.
Figure 4C:
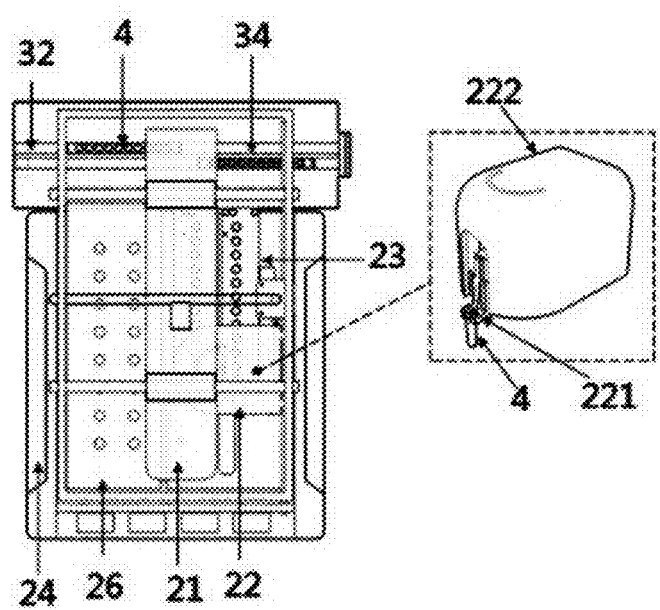
FIG. 4C is a top structural view of a reagent distribution and measurement node 2 in a sample analysis system according to the present disclosure.

As shown in FIGS. 4A, 4B, and 4C, which are the side and top views showing an implementation of the reagent distribution and measurement node 2. The reagent distribution and measurement node 2 includes: a reagent distribution and measurement control device, a reagent distribution and measurement device connected to the reagent distribution and measurement control device for aspiration, transfer, and discharge of the reagent to the cuvette 4 in the current node for measurement under control of the reagent distribution and measurement control device; and a reagent distribution and measurement node fixing frame 24 for fixing various portions of the reagent distribution and measurement node to an independent structure.

The reagent distribution and measurement device further includes a node rail 32, a reagent distribution module 21, a measurement module 23, and a cuvette transfer module 22.

A gripper mechanism 221 on the cuvette transfer module 22 grips a cuvette 4 loaded with a sample from the node rail 32. The cuvette 4 is transferred to an incubation module 25 in the reagent distribution and measurement node 2 by a motion mechanism 222. Then the aspiration and discharge component 211 on the reagent distribution module 21 aspirates analysis reagent from the reagent storage module 26. The aspiration and discharge component 211 is moved by a motion mechanism 212 to the location of the cuvette 4 on the incubation module 25 and discharges the aspirated reagent into the cuvette 4. A blending mechanism blends the liquid in the cuvette 4 evenly. Thereafter, the cuvette 4 loaded with the mixture liquid of the reagent and the sample is moved to the measurement module 23 through movement of the gripper mechanism 221 and the sample analysis process is completed in the measurement module 23. Then the cuvette 4 is transported by the node rail 32 to the next functional node.

Said gripper mechanism 221 and aspiration and discharge component 211 include, without limitation, components driven by pneumatic, electric, or hydraulic actuation. The structure of the aspiration and discharge component 211 for reagent aspiration may be a tubular structure such as a reagent probe, a reagent tube, or the like. The structure for reagent aspiration includes, without limitation, one enabling aspiration through movement in a pipeline (one with multiple ports, i.e., the liquid transfer process including aspiration through one end and discharge through the other), and one enabling aspiration through reagent probe aspiration and reagent probe displacement (the reagent probe is connected with a spatial motion rail and a transmission mechanism, i.e., the movement in which the reagent probe aspirates reagent, the reagent is spatially moved to a designated location, and the liquid is discharged). The motion of the reagent may be a motion such as planer motion, rotation around an axis center over a certain radius, planar and vertical three-dimensional motions, and rotation around an axis center over a certain radius combined with vertical motion, or the like. The gripper mechanism 221 may further be connected with a spatial motion mechanism, including, without limitation, a mechanical structure of motion such as planar motion, vertical motion, three-dimensional motion, rotation, or the like, for bringing along the cuvette gripped by the gripper mechanism and transferring it to the measurement location on the reagent distribution and measurement node.

Said reagent distribution and measurement node further includes a blending mechanism with blending function, specifically, one capable of driving the liquid in movement of blending, including, without limitation, blending through bubbling, agitation, ultrasound, vibration, or the like.

Said reagent distribution and measurement node further includes a reagent storage module for storage of analysis reagent. In the case of a reagent of biological material, the reagent storage structure may further include an assembly associated with cooling for cooling the reagent atmosphere in the storage structure down to various temperature ranges, which can provide various levels of temperature regulation based on well-known techniques in the industry. The reagent storage module in the reagent distribution and measurement node can operate in two storage modes, i.e. cooling storage and non-cooling storage, so as to provide storage for analysis reagents with different characteristics.

The reagent distribution and measurement node fixing frame 24 is used for fixing the functional components and modules in the reagent distribution and measurement node. The reagent distribution and measurement node fixing frame 24 may further have an independent panel 241 (referring to FIG. 1B) connected to its surface that is mated thereto to form a relatively independent functional device and also facilitates combination with other nodes.

The rail of said node rail 32 has a mechanical design for transmission of movement, including, without limitation, a belt, a gear, a screw, or the like.

Said cuvette 4 is a container made of solid material, including, without limitation, plastic, glass, quartz, metal, or the like, that cannot be easily broken and can be recycled conveniently. The cuvette 4 as the container for a sample may be in the unit of one, or may be in the form of a cuvette row of several connected cuvettes.

The measurement module 23 may utilize a measurement principle including optical measurement, electrical measurement, acoustical measurement, magnetic measurement, or the like. Examples of the specific testing principle are shown in FIGS. 5A-7.

Figure 5A:
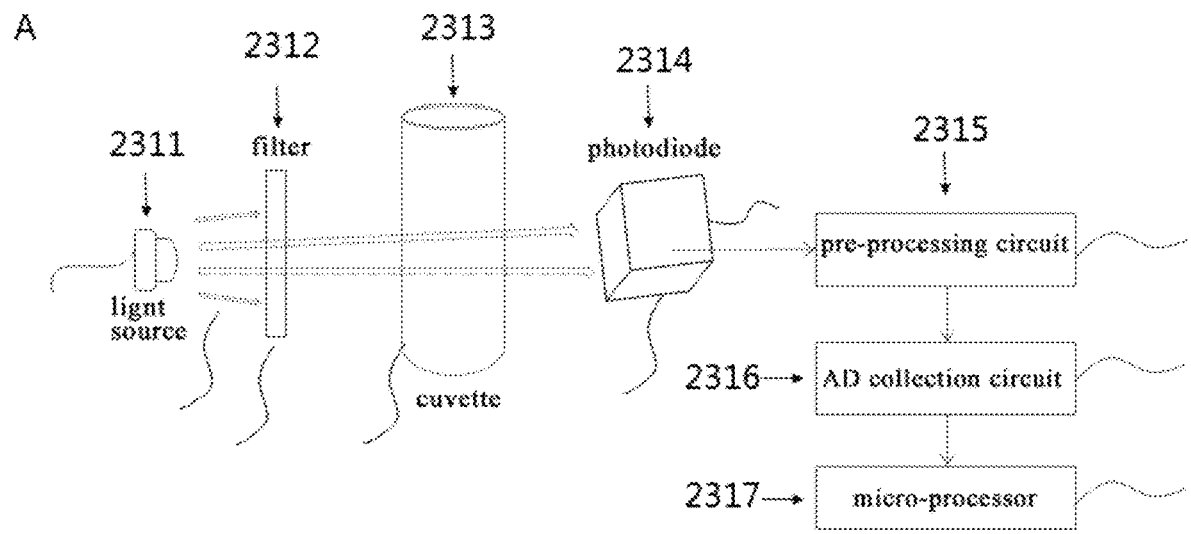
FIG. 5A shows an implementation of A part of a measurement module in a sample analysis system according to the present disclosure.

For example, in the case of optical measurement, as shown at part A in FIG. 5A, after the spectrum emitted from a light source 2311 passes through a filter 2312, only light of a specific wavelength arrives at and passes through a cuvette 2313 loaded with the sample-reagent mixture liquid. Then, the optical signal passing through the cuvette 2313 is collected by a photodiode 2314 and converted into an electric signal. Then the electric signal is collected by a pre-processing circuit 2315 and an AD collection circuit 2316 and processed by a microprocessor 2317 and converted into a displayable digital signal.

Figure 5B:
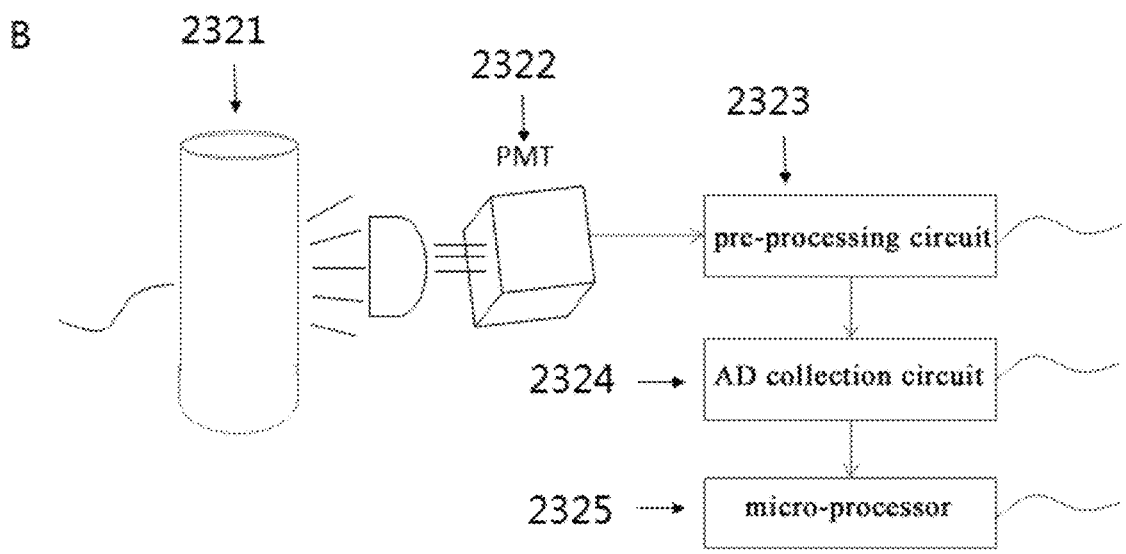
FIG. 5B shows an implementation of B part of a measurement module in a sample analysis system according to the present disclosure.

At part B in FIG. 5B, the sample reacts with the reagent in the cuvette 2321 to generate a particular optical signal, which is collected by a photomultiplier tube (PMT) 2322 and converted into a detectable electric signal. Then the electric signal is collected by a pre-processing circuit 2323 and an AD collection circuit 2324 and processed by a microprocessor 2325 and converted into a displayable digital signal.

Figure 6:
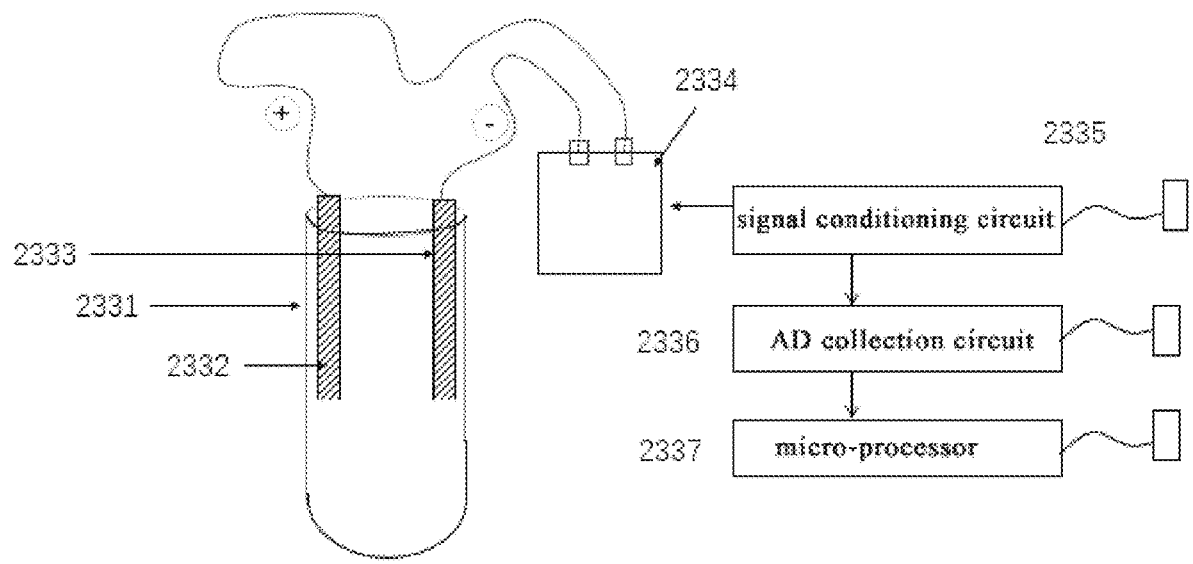
FIG. 6 shows another implementation of a measurement module in a sample analysis system according to the present disclosure.

As shown in FIG. 6, in the case of electrical measurement, an anode 2332 and a cathode 2333 are inserted into the cuvette 2331. The sample reacts with the reagent to generate an electric signal that can be collected by 2334. The collected electric signal is preliminarily processed by a signal conditioning circuit 2335 to condition the signal intensity. Then the electric signal is collected by an AD collection circuit 2336 and converted by a micro-processor 2337 into a displayable digital signal.

Figure 7:
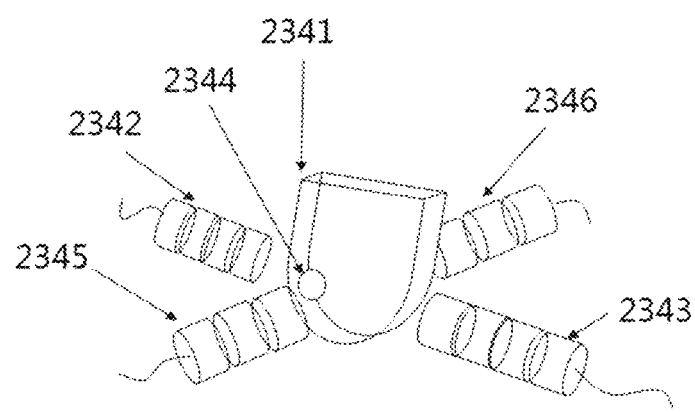
FIG. 7 shows still another implementation of a measurement module in a sample analysis system according to the present disclosure.

For example, in the case of magnetic measurement, referring to FIG. 7, a fixed magnetic field is provided by magnetic bars 2342 and 2343 before and after a cuvette 2341 of a curved track configuration, inducing the magnetic beads 2344 in the cuvette 2341 into reciprocation. Meanwhile, a magnetic signal is generated after power-on of a magnetic pot 2345 on one side of the cuvette, and can be received by a magnetic pot 2346 on the other side, transmitted over a circuit, and converted into an electric signal. When the liquid in the cuvette 2341 becomes clear, the magnetic beads 2344 reciprocate at the same speed so that the electric signal finally formed is displayed on the display end as a regular wave band. As the sample reacts with the reagent in the cuvette 2341, the solution starts to become cloudy. The magnetic beads 2344 are subject to resistance that becomes increasingly greater during the reciprocation and move at a gradually lower speed or even stop, so that the wave band displayed on the display end starts to have smaller amplitude until it becomes a straight line. The concentration of the sample can be analyzed through the variation tendency of the wave band.

Figure 8A:
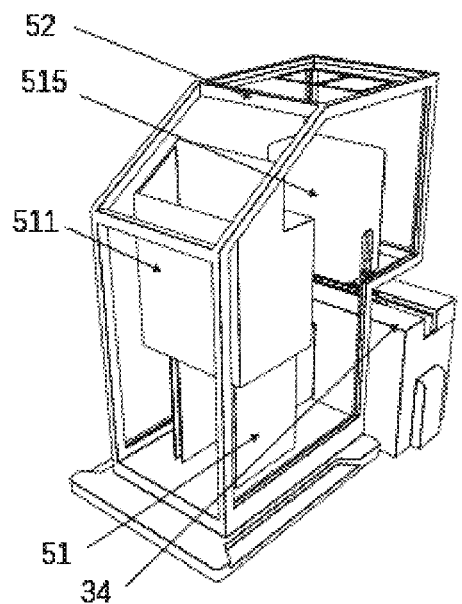
FIG. 8A is a side structural view of a consumables distribution node 5 in a sample analysis system according to the present disclosure.
Figure 8B:
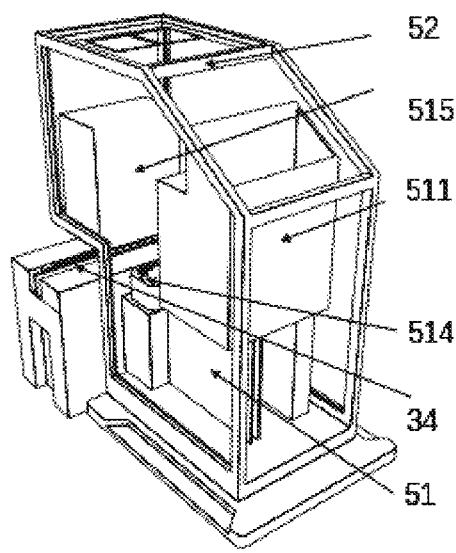
FIG. 8B is another side structural view of a consumables distribution node 5 in a sample analysis system according to the present disclosure.
Figure 8C:
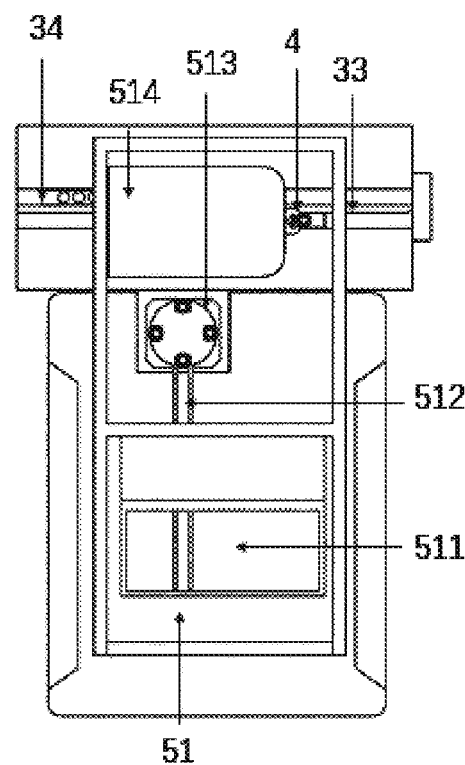
FIG. 8C is a top structural view of a consumables distribution node 5 in a sample analysis system according to the present disclosure.

As shown in FIGS. 8A, 8B, and 8C, which are side and top views of a cuvette distribution node 5 included in said sample analysis system, the cuvette distribution node 5 can be used for providing cuvettes 4 to other nodes in said sample analysis system. The cuvette distribution node 5 includes: a cuvette distribution control device; a cuvette distribution device for loading cuvettes onto the rail device in order under control of the cuvette distribution control device; and a cuvette distribution node fixing frame 52 for fixing various portions of the cuvette distribution node to an independent structure.

The cuvette distribution device further includes a second cuvette distribution module 51 and a node rail module 33. Numerous cuvettes 4 are stored in a cuvette feeding mechanism 511 of the second cuvette distribution module 51, then the cuvettes 4 are loaded out of order into a slideway 142 (a non-bidirectional rail) by the cuvette feeding mechanism 511, and thereafter the cuvettes 4 arrive at a cuvette tray mechanism 513 under gravity. Thereafter, the gripper mechanism 514 grips and loads empty cuvettes 4 onto the node rail module 33. An independent panel 521 may further be fixed to the surface of the fixing frame 52 for fixing components and modules.

Figure 9A:
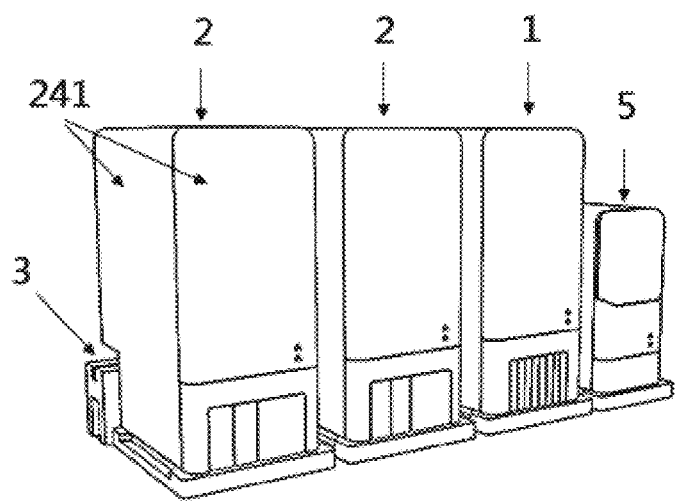
FIG. 9A is a side structural view of a sample analysis system including a cuvette distribution node according to the present disclosure.
Figure 9B:
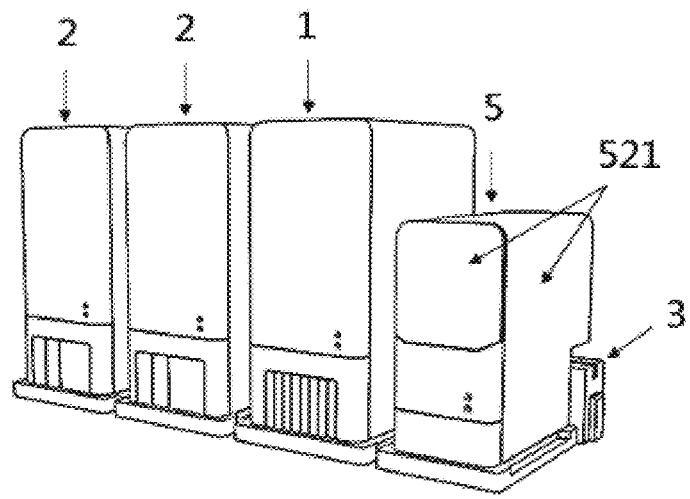
FIG. 9B is another side structural view of a sample analysis system including a cuvette distribution node according to the present disclosure.
Figure 9C:
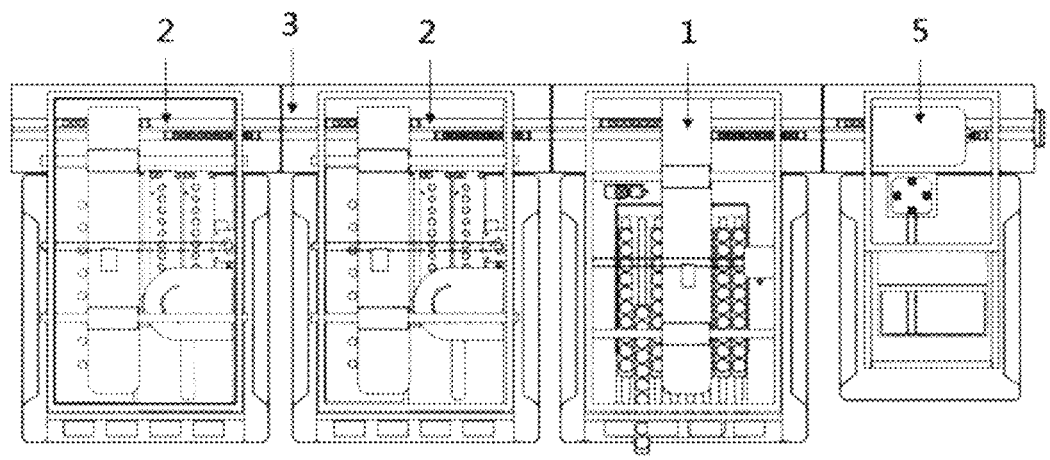
FIG. 9C is a top structural view of a sample analysis system including a cuvette distribution node according to the present disclosure.

Refer to FIGS. 9A, 9B, and 9C, which are side and top structural views of a sample analysis system including a cuvette distribution node in this embodiment. Said sample analysis system may include a cuvette distribution node 5, a sample distribution node 1, and two sample analysis nodes 2 (i.e., reagent distribution and measurement nodes 2) that are combined and assembled detachably via the rail device 3. Numerous cuvettes 4 are provided to the rail 3 by the cuvette distribution node 5 and then transmitted over the rail 3. The cuvettes 4 arrive at the sample distribution node 1, then samples are loaded into the cuvettes 4 by the sample transfer module 11 in the sample analysis node 1, and finally arrive at the sample analysis node 2 for measurement and analysis.

Figure 10A:
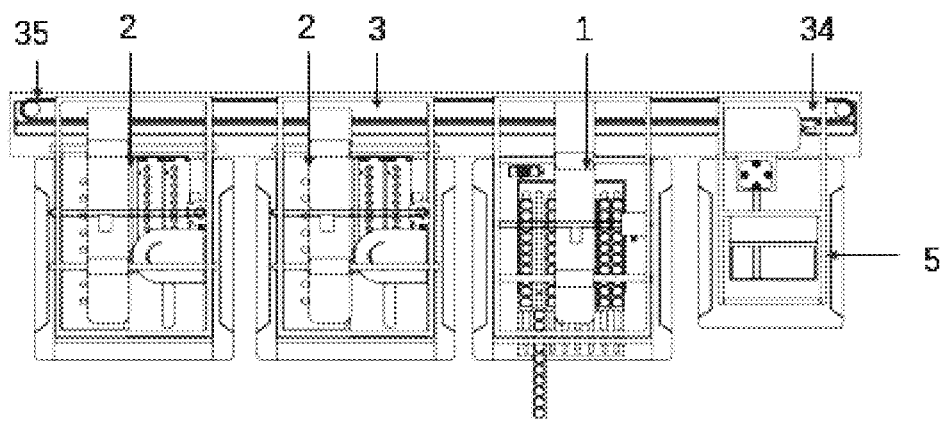
FIG. 10A is a top structural view of a sample analysis system having an integrated rail device according to the present disclosure.
Figure 10B:
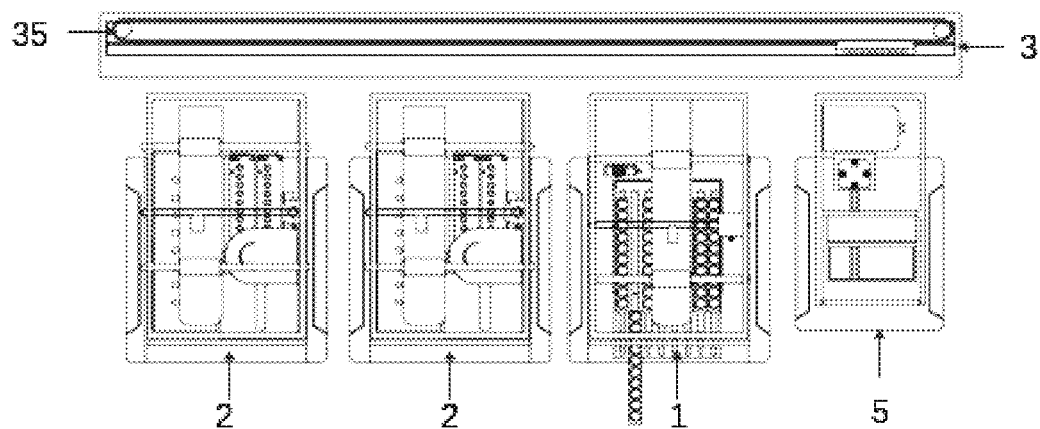
FIG. 10B is a top structural view of disassembly of a sample analysis system having an integrated rail device shown in FIG. 10A.

In some other alternative embodiments, in said sample analysis system, the rail device 3 may also be a single rail of connected segments. As shown in FIGS. 10A and 10B, the cuvette distribution node 5, the sample distribution node 1, and the reagent distribution and measurement nodes 2 are assembled and combined on the rail device 3. The gears 35 at both sides of the rail device 3 drive the vehicle 34 to transmit the cuvettes 4 from the cuvette distribution node 5 to other nodes.

As the sample distribution node 1, the reagent distribution and measurement nodes 2, and the cuvette distribution node 5 described above are all functional units of an independent frame structure, the nodes can be removed and the part of the node rail can be reserved based on different combination rules, without influencing the normal use of the remaining parts of the sample analysis system, thereby facilitating maintenance. Alternatively, the part of the rail and the node can be detached and removed together, and the remaining nodes can still be assembled via the node rail and used, and new nodes can be added, thereby realizing free combination and efficient expansion of said distributed sample analysis system into different sample analysis systems.

Third Embodiment

Another implementation of the present disclosure provides a control method for a sample analysis system for control of said sample analysis system, including the steps of:
  acquiring a task type and the status of the nodes;
  determining a combination rule of the nodes based on the task type and the status of the nodes; and
  performing sample analysis based on the combination rule.

Further, the step of performing sample analysis based on the combination rule includes:
  planning a testing path including selection and combination of the nodes and rails based on the combination rule; and
  performing sample analysis based on the testing path.

First, the task type input into said sample analysis system, including task number, task project, and task requirement, is acquired; and at the same time, the status of the resource node of said sample analysis system, i.e., the utilization of the resource node, whether there is any abnormal resource, or the like is acquired, the resource node including the sample distribution node, the reagent distribution and measurement node, and the cuvette distribution node.

Then the combination rule is determined based on the acquired task type and the status of the recourse node. That is, the type and number of the nodes is selected based on the task type, then a node that is not abnormal and not occupied is selected based on the status of the resource node, so as to satisfy the requirements of the task. The combination rule includes sample priority principle, speed priority principle, resource priority principle, or the like.

Finally, sample analysis is performed based on said combination rule, that is, the selected nodes are assembled in the order of sample analysis via the rail device, so as to obtain a testing path of the sample analysis system. Then sample analysis is performed through cooperation of the nodes via movement of the rail.

Figure 11:
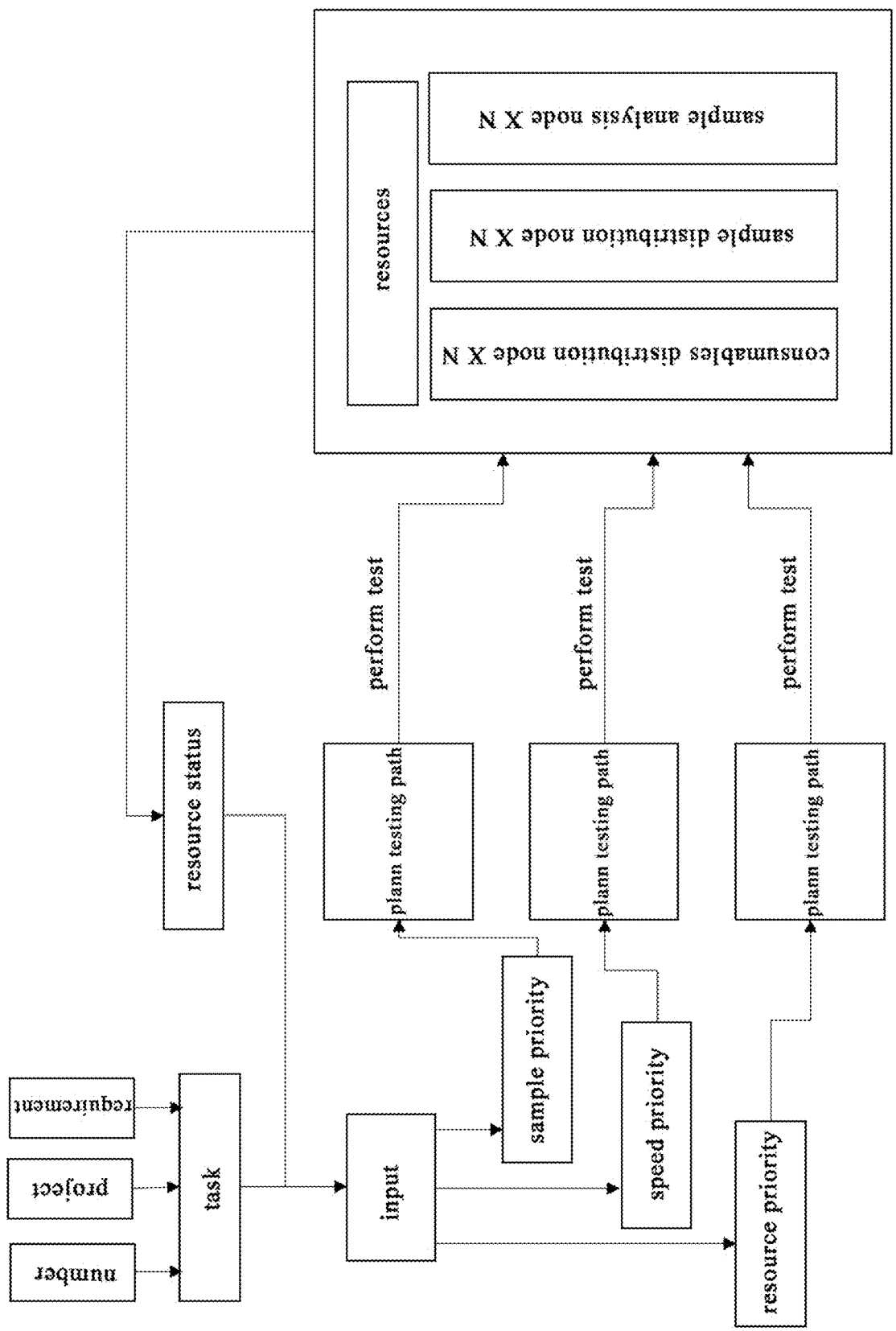
FIG. 11 is a diagram showing the control loop of a control method for a sample analysis system according to the present disclosure.

The control process flow of the overall sample analysis system is shown in FIG. 11. Different task types are distinguished based on the task number, task project, and task requirement. Then, in combination with the status of each resource node, an optimum control mode is selected from control modes corresponding to the three combination rules to complete the sample analysis task. In all the three modes, the path and sequence in which the samples run in the nodes can be selected. For example, if the task type is an emergency task, then the sample priority control mode is enabled. That is, both the node and the rail load, offload, and measure the vehicle in which the priority sample is situated in priority. If the task involves a large number of samples, then the speed priority mode is selected, so that the node, rail, and vehicle are distributed to an idle node with the highest efficiency, thereby avoiding resource waste and consequently achieving the optimum sample distribution and analysis speed. If, however, a small number of samples are to be measured, or the different nodes in the measurement system select different measurement projects, then the node priority mode is preferably selected, so that analysis and testing at a designated node can be completed, thereby significantly improving the analysis efficiency.

Figure 12:
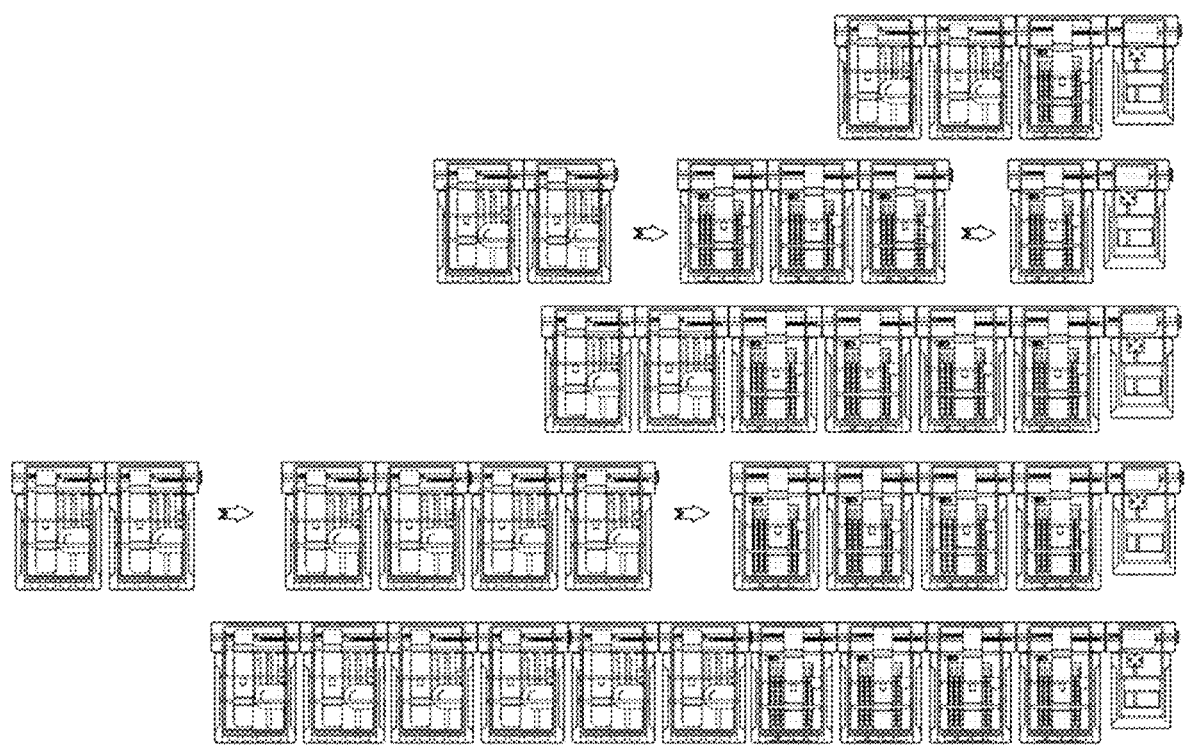
FIG. 12 is a view showing the node combination and the expansion of a sample analysis system according to the present disclosure.

Moreover, as said sample analysis system described above has high freedom and high expendability, the control method for said sample analysis system can control a plurality of the sample distribution node 1, the sample analysis node 2, and the cuvette distribution node 5 to be freely assembled via the rail 3 to form a distributed structure. For example, as shown in FIG. 12, in the distributed sample analysis system, in addition to one cuvette distribution node 5, one sample distribution node 1, and two sample analysis nodes 2, multiple sample distribution nodes 1 can be added so as to improve the efficiency of sample aspiration. Also, multiple sample analysis nodes 2 of the same or different analysis functions can be further added, so as to fulfill efficient analysis of multiple samples or simultaneous analysis of different samples. In the overall analysis system, multiple nodes with different or same functions can be freely expanded through extension or assembly of the rails. The control method for said sample analysis system controls the number and combination manner of the sample distribution node and the reagent distribution and measurement node in said sample analysis system and adjusts the multiple presented coordination manners through combination and connection, without departing from the scope of variation of the present solution.

Fourth Embodiment

Another implementation of the present disclosure provides a sample analysis method, including the steps of:
distributing, by the cuvette distribution node, cuvettes onto the rail device and conveying the cuvettes to the sample distribution nodes by way of the rail device communicating the multiple nodes;
distributing, by the sample distribution node, the samples to the cuvettes;
conveying the cuvettes to the reagent distribution and measurement nodes through movement of the rail device;
distributing, by the reagent distribution and measurement nodes, the analysis reagent to the cuvettes, and performing measurement and analysis on the sample-reagent mixture liquid in the cuvettes; and
finishing analysis or repeating the steps described above.

Cuvettes are distributed to the rail device by at least one cuvette distribution node and transported to at least one sample distribution node of an independent frame structure via the rail, and then samples are distributed to the cuvettes. The test reagent is distributed to the cuvettes by the multiple reagent distribution and measurement nodes of independent frame structures, and measurements and analysis of the reagent-sample mixture liquid are performed in sequence by these reagent distribution and measurement nodes. The rail communicating various nodes is used for transfer of the cuvettes between various nodes and transportation of the cuvettes between various nodes. A control system is provided to control the cuvette distribution node, the sample distribution node, and the reagent distribution and measurement nodes to cooperate with the rails.

The distributed sample analysis system provided by the present disclosure uses cuvettes as the medium and employs multiple relatively independent sample distribution nodes and multiple relatively independent reagent distribution and measurement nodes. The control method for the sample analysis system controls the nodes to be freely combined and connected via rails, so that the constraint of physical cooperation relationship between sample distribution components and sample analysis components in conventional instruments are eliminated, thereby providing a fully automated analysis system with small size, high efficiency, high freedom, and high expandability. Besides, the nodes can be freely added and freely combined and connected to form analysis systems with various speeds and analysis functions, thereby significantly improving the utilization of the structural components in the instrument and enabling easy installation and maintenance.

Described above are only the preferred embodiments of the present disclosure that are not intended to limit the present disclosure. Any modification, equivalent replacement, and improvement made within the spirit and principle of the present disclosure shall fall in the protection scope of the present disclosure.

What is claimed is:

1. A sample analysis system, comprising:
a control device;
a rail device for carrying cuvettes under control of the control device;
at least one independent sample distribution node arranged on the rail device for distributing samples to the cuvettes, the independent sample distribution node being used for sample aspiration, transfer, and discharge; and
at least two independent reagent distribution and measurement nodes arranged on the rail device for distributing test reagents to the cuvettes and measuring mixture liquid in the cuvettes, the independent reagent distribution and measurement nodes being used for reagent aspiration, transfer, and discharge and reagent-sample mixture liquid measurement;
the cuvettes being used for containing the samples and reagents and signal measurement;
wherein the sample distribution node comprises:
a sample distribution control device;
a sample distribution device for aspiration, transfer, and discharge of a sample to a cuvette in a current node under control of the sample distribution control device; and
a sample distribution node fixing frame for fixing various portions of the sample distribution node to an independent structure.

2. The sample analysis system of claim 1, wherein the rail device comprises multiple node rails corresponding to the sample distribution node and the reagent distribution and measurement nodes for communication between individual nodes, the multiple node rails constituting an integrated synchronized motion structure or a dividable structure consisting of free assembly and combination.

3. The sample analysis system of claim 1, wherein the reagent distribution and measurement node comprises:
a reagent distribution and measurement control device;
a reagent distribution and measurement device for aspiration, transfer, and discharge of a reagent to the cuvette in the current node for measurement under control of the reagent distribution and measurement control device; and
a reagent distribution and measurement node fixing frame for fixing various portions of the reagent distribution and measurement node to an independent structure.

4. The sample analysis system of claim 3, wherein the analysis system has concurrency,
combination of a sample distribution node with a reagent distribution and measurement node provides a basic measurement function of the analysis system; the reagent distribution and measurement node and sample distribution node beyond the basic measurement function combination constitute concurrent operation nodes; and
under coordination of the control system, in case that the reagent distribution and measurement node and sample distribution node beyond the basic measurement function combination are in a failure mode or a halt mode, said basic measurement function can still realize a sample analysis process.

5. The sample analysis system of claim 4, wherein the sample distribution node and reagent distribution and measurement nodes are combined according to different combination rules and arranged on the rail device to constitute different sample analysis systems, and these sample analysis systems can be expanded by adding the sample distribution node and reagent distribution and measurement nodes and configuring the rail device.

6. The sample analysis system of claim 5, wherein the sample analysis system further comprises:
a cuvette distribution node for providing cuvettes to other nodes in the sample analysis system.

7. The sample analysis system of claim 6, wherein the cuvette distribution node further comprises:
a cuvette distribution control device;
a cuvette distribution device for loading the cuvettes onto the rail device in order under control of the cuvette distribution control device; and
a cuvette distribution node fixing frame for fixing various portions of the cuvette distribution node to an independent structure.

8. The sample analysis system of claim 3, wherein the reagent distribution and measurement node further comprises a blending mechanism for blending the sample, the reagent, and the reagent-sample mixture liquid evenly.

9. The sample analysis system of claim 8, wherein the reagent distribution and measurement node further comprises a gripper mechanism and a motion mechanism, the gripper mechanism being used for gripping the cuvette on the rail or in a vehicle, the motion mechanism being used for bringing and transferring the cuvette gripped by the gripper mechanism to a measurement location of the reagent distribution and measurement node.

10. The sample analysis system of claim 9, wherein the reagent distribution and measurement node further comprises a reagent storage module for storing analysis reagent.

11. The sample analysis system of claim 1, wherein each of the cuvettes is a container made of a solid material to serve as a carrier for sample and reagent distribution, transfer, and measurement.

12. A control method for a sample analysis system for controlling the sample analysis system of claim 1, comprising steps of:
acquiring a task type and status of nodes;
determining a combination rule for the nodes based on the task type and the status of the nodes; and
performing sample analysis based on the combination rule.

13. The control method for a sample analysis system of claim 12, wherein the step of performing sample analysis based on the combination rule comprises:
planning a testing path including selection and combination of the nodes and rails based on the combination rule; and
performing sample analysis based on the testing path.

14. A sample analysis method for the sample analysis system of claim 1, comprising the steps of:
distributing, by the cuvette distribution node, cuvettes onto the rail device and conveying the cuvettes to the sample distribution node by way of the rail device communicating multiple nodes;
distributing, by the sample distribution node, the samples to the cuvettes;
conveying the cuvettes to the reagent distribution and measurement nodes through movement of the rail device;
distributing, by the reagent distribution and measurement nodes, the analysis reagent to the cuvettes, and performing measurement and analysis on the sample-reagent mixture liquid in the cuvettes; and
finishing analysis or repeating the above steps.

* * * * *